United States Patent Office 3,494,646
Patented Feb. 10, 1970

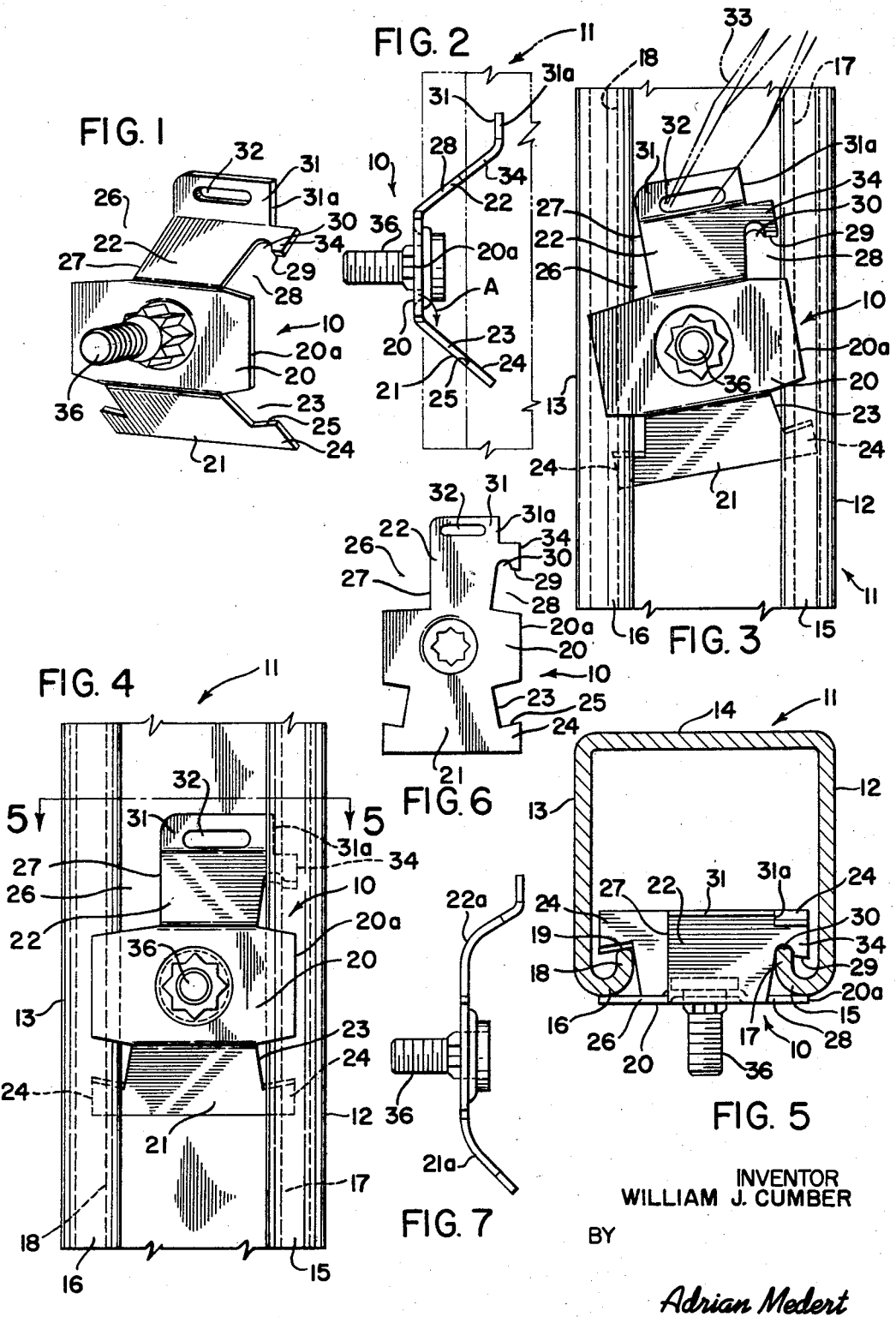

3,494,646
FASTENING DEVICES
William J. Cumber, Chardon, Ohio, assignor to Erico Products, Inc., Cleveland, Ohio, a corporation of Ohio
Filed June 13, 1968, Ser. No. 736,656
Int. Cl. F16b 1/00, 5/00, 7/00
U.S. Cl. 287—189.36                 9 Claims

ABSTRACT OF THE DISCLOSURE

This invention relates to a clip or fastening device for assembly with a channel shaped structural member made of a unitary piece of spring steel adapted to be self-clamping at the open side of the channel member. The clip includes a body portion which spans the distance between the sides of the channel and overlaps the same, has angulated extensions thereon projecting into the channel opening upon which are formed tongues arranged to engage the edges of inturned flanges formed on the side of the channel member.

---

This invention relates to steel metal fastening devices and more particularly, to a fastener in the form of a novel clip member of spring metal which can be readily applied to a position of use in connection with a channel shaped member.

It has been common practice to provide a channel shaped beam, either as a structural part of or auxiliary to a building frame, capable of receiving bolts or threaded parts throughout its length to facilitate supporting therefrom, pipes, conduits, electrical fixtures, wall members, racks, bars, and the like. For example, structures used heretofore included the type wherein a threaded rectangular nut was inserted into the channel longitudinally thereof and then rotated to traverse the channel with the ends thereof resting on inturned lips of the side walls of the channel member. The nut was maintained in position by inserting a threaded rod through the member and abutting the end thereof against the web of the channel. Other prior structures embodied a bolt-like member which had a rectangular head adapted to be inserted between the inturned flanges on the channel member and then rotated into position so that the head portion of the bolt spanned the distance between the flanges and rested thereagainst. Various types of spring members disposed between the head of the bolt member and the web of the channel were utilized to maintain the head of the bolt member against the inturned flanges of the channel member.

It was found that such prior art devices embodied many undesirable characteristics, for example, such devices had limited use and were not readily adapted to channel shaped supporting members of varying sizes and configurations, were not unitary in design thus requiring a rod or auxiliary spring member to hold the threaded member in position. Furthermore, such devices were relatively expensive requiring large inventories to be maintained if such devices were to be used with all types of channel members.

The channel member with which the clip of the present invention is adapted to be employed may take various forms in installation. For example, the channel may be used as a part of a vertical wall or the channel member may be suspended from the ceiling. In either case, the fastening device of the present invention can be readily applied to the channel member, and when so applied, it will retain its fixed position.

Accordingly, it is among the objects of the present invention to provide a simple and efficient unitary fastening device which overcomes the drawbacks of prior art devices and which is exceedingly simple and inexpensive to manufacture, may be readily assembled with or mounted on a channel member and when so assembled or mounted, presents a relatively rigid and integrated structure.

Another object of the invention is to provide a fastening device which when assembled with a channel shaped member is self-clamping in a predetermined desired position independent of any bolt or spring or other means of positioning the same.

A still further object of the invention is to provide a light weight one piece clip member adapted to be resiliently mounted on the inturned edges of a channel like member.

Another object of the invention is to provide a clip member for a channel shaped structural member which when mounted thereon is secure against shifting longitudinally of the structural member.

Still another object of the invention is to provide a clip member adapted to be attached to a channel shaped structural member in such a manner as to provide an uninterrupted passage longitudinally within the structural member.

These and other objects and advantageous features of the present invention will become more apparent from the following detailed description of a preferred embodiment thereof, taken in conjunction wth the accompanying drawing wherein corresponding reference characters throughout denote corresponding parts and wherein:

FIGURE 1 is a perspective view of a fastening device, embodying the present invention, FIGURE 2 is a side elevational view of the device of FIGURE 1, FIGURE 3 is a top plan view illustrating the first step in the assembly of the fastening device of FIGURE 1 with a channel shaped structural member.

FIGURE 4 is a view similar to FIGURE 3 in which the fastening device of FIGURE 1 is completely assembled with the structural member.

FIGURE 5 is a sectional view taken on the line 5—5 of FIGURE 4,

FIGURE 6 is a top plan view of a modified form of fastening device embodying the invention, and FIGURE 7 is a side elevational view of the device of FIGURE 6.

With reference to the accompanying drawing and particularly FIGURES 1 to 5 inclusive, there is illustrated a fastening device or clip for securing to and supporting from a channel shaped structure member, made in accordance with the teachings of this invention and generally indicated by the numeral 10. The fastening device 10 is formed of a suitable resilient sheet material such as spring steel strip. As shown in FIGURES 3, 4, and 5, the fastening device 10 is adapted to be assembled with an elongated channel shaped structural member of beam 11, having a pair of side walls 12 and 13 connected by a web or backwall 14. Opposed flanges 15 and 16 are bent inwardly from the lower edges of the side walls 12 and 13 and terminate in reversely extending wall portions 17 and 18 respectively, which are substantially parallel with their adjacent sidewalls. The free edges 19 of the wall portions 17 and 18 are spaced inwardly from the longitudinal edges of the sidewall members 12 and 13 as will be referred to more particularly hereinafter.

The fastening device 10 (FIGURE 1) formed of spring steel includes a substantially flat body portion 20 of sufficient length to span the space between the inturned wall portions 17 and 18 and overlap and engage the curved surfaces of the opposed flanges 15 and 16. Projecting outwardly from each side of the body portion 20 are angulated extensions 21 and 22. The interior angles A between the body portions and the extension 21 and 22 are obtuse angles, the degree of angulation depending generally on the height of the wall portions 17 and 18. For use with most structural channel members this angle may vary from one hundred twenty to one hundred fifty degrees. The angulated extension 21 of the body portion 20 is generally T-shaped in configuration being formed by making rectangular slots 23 extending into the body portion from the opposite end edges thereof at an angle thereto and bending the extension inwardly along a line connecting the innermost points of said slots. The laterally projecting portions of the extension 21 between the slots 23 and the outer edges thereof define tongues 24 having inclined upper surface 25 which are normal to the surface of the extension and when the clip 10 is assembled with the channel member 11, a sharp edge is caused to engage the edge surface 19 of the inturned wall portions 17 and 18. The inherent spring tension in the metal initially effects a biting in of the edge of the wall 25 and as the clip is caused to support a load, the biting in is increased so that the clip is secured against longitudinal shifting with respect to the channel member.

The angulated extension 22 on the opposite side of the body portion 20 is cut away as at 26 along one side thereof to reduce the width of the extension and provide a straight side edge 27 on one side of the extension 22. On the side of the extension 22 opposite edge 27 there is formed an inwardly extending angulated slot 28 similar to the slots 23 of the extension 21, which slot defines a tongue 34 on this side of the extension. To form the angulated extension 22, a bend is made along a line connecting the innermost end of slot 28 and the point of intersection of side 27 with the body portion 20. The wall 29 of the slot 28 remote from the body portion 20 is provided with a notch 30 having a wall extending normal to the surface of the extension 22. Said notch presents a sharp edge to the edge surface 19 of the wall 17 of the channel member when the fastening device is in assembled relation therewith.

Integrally formed with the outer edge portion of the extension 22 is a tool engaging flange 31 extending substantially parallel with the body portion 20 and having an opening 32 therethrough for receiving the end 33 of screw driver or like tool (FIGURE 3). As will be seen in FIGURE 1, the flange 31 is cut away adjacent to the tongue 34 to form a shoulder 31a which will be referred to hereafter. To facilitate the assembly of the clip with the channel member, the longitudinal edge portion 20a of the body portion 20 between the tongues 24 and 34 is flared upwardly from the angulated extensions out of the plane of the body portion.

The body portion 20 of the fastening device is provided with a central opening 35 for receiving a suitable stud 36 to which a member to be supported from the channel may be attached. In lieu of the stud receiving opening 35 the surface of body portion 20 may be formed with a screw receiving opening in the shape of a helix and a radial slot.

With reference to FIGURES 6 and 7 of the drawing, there is illustrated a slightly modified form of fastening device embodying the invention. The modification incorporates all of the essential structural elements of the device of FIGURES 1 thru 5, differing thereover in the formation and angulation of the extension 21 and 22 on opposite sides of the body portion 20. In FIGURE 7, it is to be noted that the space between the bend lines connecting the body portion and the extensions 21a and 22a have been increased thus reducing the distance between a plane through the ends of the extensions and the plane of the body portion 20. The angulation of the extension 21a with respect to the body portion 20 is substantially the same as that in the device of FIGURE 1, however, the angulation of the extension 22a has been reduced.

The modified form of fastening device is provided to facilitate the use of the device with channel shaped structural members wherein the inturned flanges are not formed with wall members 17 and 18 as shown in FIGURE 5. Thus, the modified structure is used when the distance between a plane through the lower extremity of the side walls 12 and 13 and a plane through the edge portions of the inturned flanges is substantially less than that in the type of channel member shown in FIGURES 3, 4, and 5.

In assembling the fastening device 10 with the channel 11 (FIGURES 3, 4, and 5) the body portion 20 is positioned above the flange 15 of the channel 11 with the extension 21 projecting into the space between the walls 17 and 18 and extending substantially parallel therewith. The body portion is simultaneously tilted into the channel between the walls, 17 and 18 and rotated counterclockwise as viewed in FIGURE 3, to bring the tongues 24 on the extension 21 below the edge surface 19 of the walls 17 and 18 and the lower surface of the edge portion of the body 20 remote from the edge portion 20a into overlapping position with respect to the flange 16. At this point the body portion 20 is inclined toward the extension 21 as the tongue 34 of the extension 22 would be resting on the outer surface of the flange 15. Continued rotation of the body portion 20 in a counter clockwise direction brings the extension 22 into position where it drops into the space between the walls 17 and 18. At this point the device is in the position shown in FIGURE 3. The end of a tool 33 is inserted into the opening 32 of the flange 31 and the extension 22 is depressed inwardly into the channel and the entire device rotated in a clockwise direction as viewed in FIGURE 3. This rotational movement brings the tongue 34 below the edge portion of the wall 17 which will engage within the notch 30. The spring tension of the metal of which the device is formed causes the edges of the surfaces 25 and the edge surface 19 of the notch 30 to bite into the edge of the inturned wall member and securely hold the clip in fixed position within the channel member 11. The clip when so assembled is in position to support any desired fixture or member from the stud 36 mounted thereon.

It is to be noted that the clip being made of spring metal when mounted in the channel shaped supporting member 11 is under tension and its inherent resistance will cause it to remain in fixed position, thus any vibration will not loosen the clip from such position, however, it can be removed without difficulty should it be necessary, by either merely reversing the steps of assembly or inserting the end of a screw driver 33 between the shoulder 31a of flange 31 and the inturned side wall 17. Simple prying action will release the notch 30 and snap the clip free of the channel member.

From the foregoing, it will be apparent that I have produced an exceedingly simple and reliable clip which can be conveniently applied to a channel member and retained in place firmly and securely due to its inherent resilience. Any number of clips can be placed along a channel member and since the mounting of the clip on the channel is confined to the area adjacent the longitudinal free edges of the channel member, the channel member can be employed to house wires and conduit if such use is desired. Where such use is made of the channel, the clips can be used to support a cover member for the open side of the channel. Liability of the clip shifting from its applied position is clearly impossible. A simple tool such as a screw driver is all that is required to assemble the fastening device or clip with the structural channel member.

It will be understood that the above description is by way of illustration and in accordance with the provisions of the patent law, variations and further modification of the specific structure disclosed therein may be made without departing from the spirit of the invention.

I claim:

1. A fastening device for assembly with a channel shaped structural member which has inturned flanges along the edges of the side walls thereof comprising a body portion arranged to span and overlap the space between the inturned flanges and engage the outer surface of said flanges, said body portion having opposed angulated extensions disposed within the channel shaped structural member, one of said extensions having laterally extending tongues engaging the inturned flanges on said side walls and the other of said extensions having one laterally extending tongue engageable with the inturned flange on one of said side walls.

2. A fastening device as defined in claim 1 wherein the interior angles between the body portion and the angulated extensions thereof are obtuse angles.

3. A fastening device as defined in claim 2 wherein the width of the slots in the angulated extensions of the body portion are slightly greater than the distance between parallel planes through the edge surfaces of the inturned flange portions and the lower extent of the side-walls of the channel members.

4. A fastening device as defined in claim 1 wherein the laterally extending tongues of angulated extensions on the body portion adapted to engage the inturned wall flanges of the structural member are formed by providing angulated slots extending inwardly from the sides of the extension of said body portion.

5. A fastening device as defined in claim 1 wherein surfaces of the laterally extending tongues formed in the angulated extension of the body portion are adapted to engage and bite into the edge portions of the inturned flanges of the channel shaped structural member and are spaced from the body portion a distance slightly less than the inward extent of the said inturned flanges of the structural member.

6. A one piece clip type fastener comprising a flat elongated strip of spring steel having a body portion, extensions formed on opposite sides of said body portion extending in the same direction at an angle to the body portion, slots projecting inwardly from the edges of one of said extensions and defining laterally extending tongues, and the other of said extensions having a slot defining a laterally extending tongue in one side edge thereof and the opposite side edge cut away.

7. A one piece clip type fastener as defined in claim 6 wherein the interior angles between the body portion and the opposed extensions thereon are obtuse angles.

8. A one piece clip type fastener as defined in claim 6 wherein the laterally extending tongue on the other of said extensions has one wall surface thereof suitably notched.

9. A one piece clip type fastener as defined in claim 7 wherein the edge portion of one end of the body portion is flared in a direction opposed to the direction of the said extensions.

References Cited

UNITED STATES PATENTS

| | | | |
|---|---|---|---|
| 2,273,648 | 2/1942 | Kost | 151—41.75 |
| 2,345,650 | 4/1944 | Attwood | 151—41.75 |
| 3,210,716 | 10/1965 | Meacham | 151—41.75 |
| 3,373,789 | 3/1968 | Parkin et al. | 151—41.75 |

EDWARD C. ALLEN, Primary Examiner

U.S. Cl. X.R.

151—41.75